Figure 1:
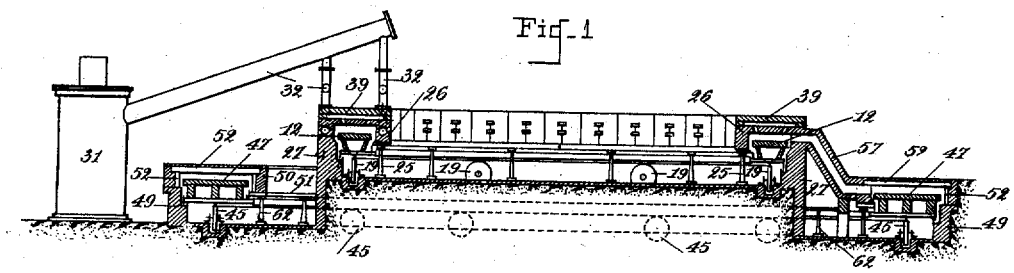

No. 695,084. Patented Mar. 11, 1902.
H. STURM.
FURNACE.
(Application filed June 25, 1901.)
(No Model.) 4 Sheets—Sheet 1.

WITNESSES:

INVENTOR.
Henri Sturm
BY
ATTORNEYS.

No. 695,084. Patented Mar. 11, 1902.
H. STURM.
FURNACE.
(Application filed June 25, 1901.)
(No Model.) 4 Sheets—Sheet 2.
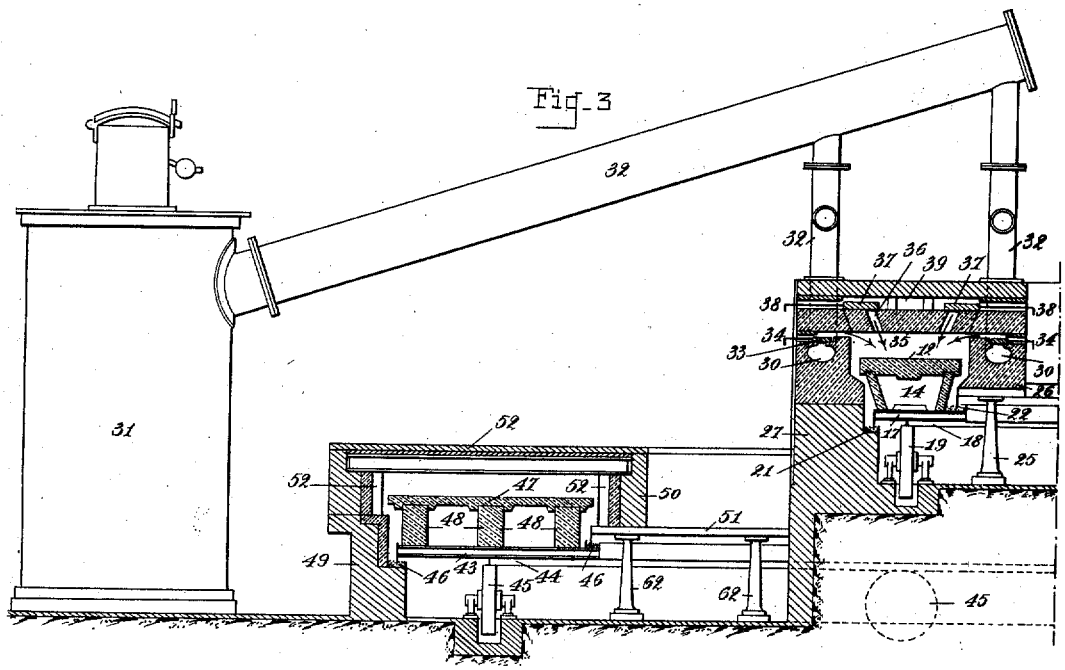
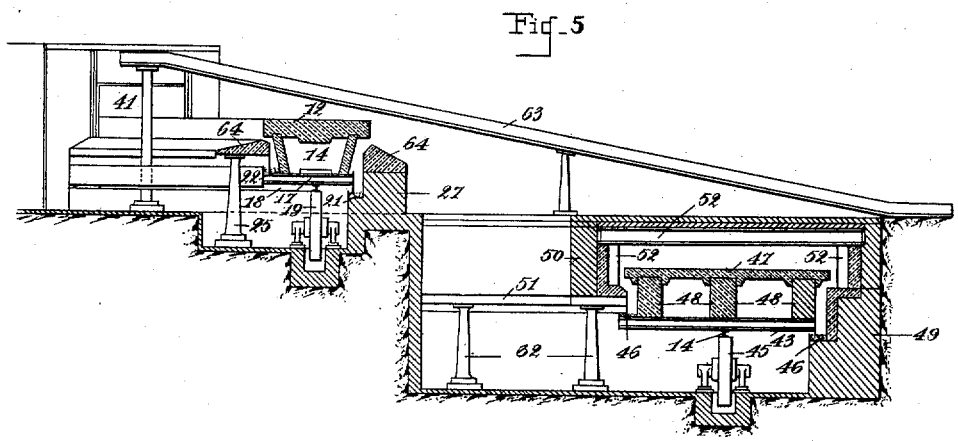
WITNESSES: INVENTOR.
Isabella Waldron Henri Sturm
BY
ATTORNEYS.

No. 695,084. Patented Mar. 11, 1902.
H. STURM.
FURNACE.
(Application filed June 25, 1901.)
(No Model.) 4 Sheets—Sheet 3.

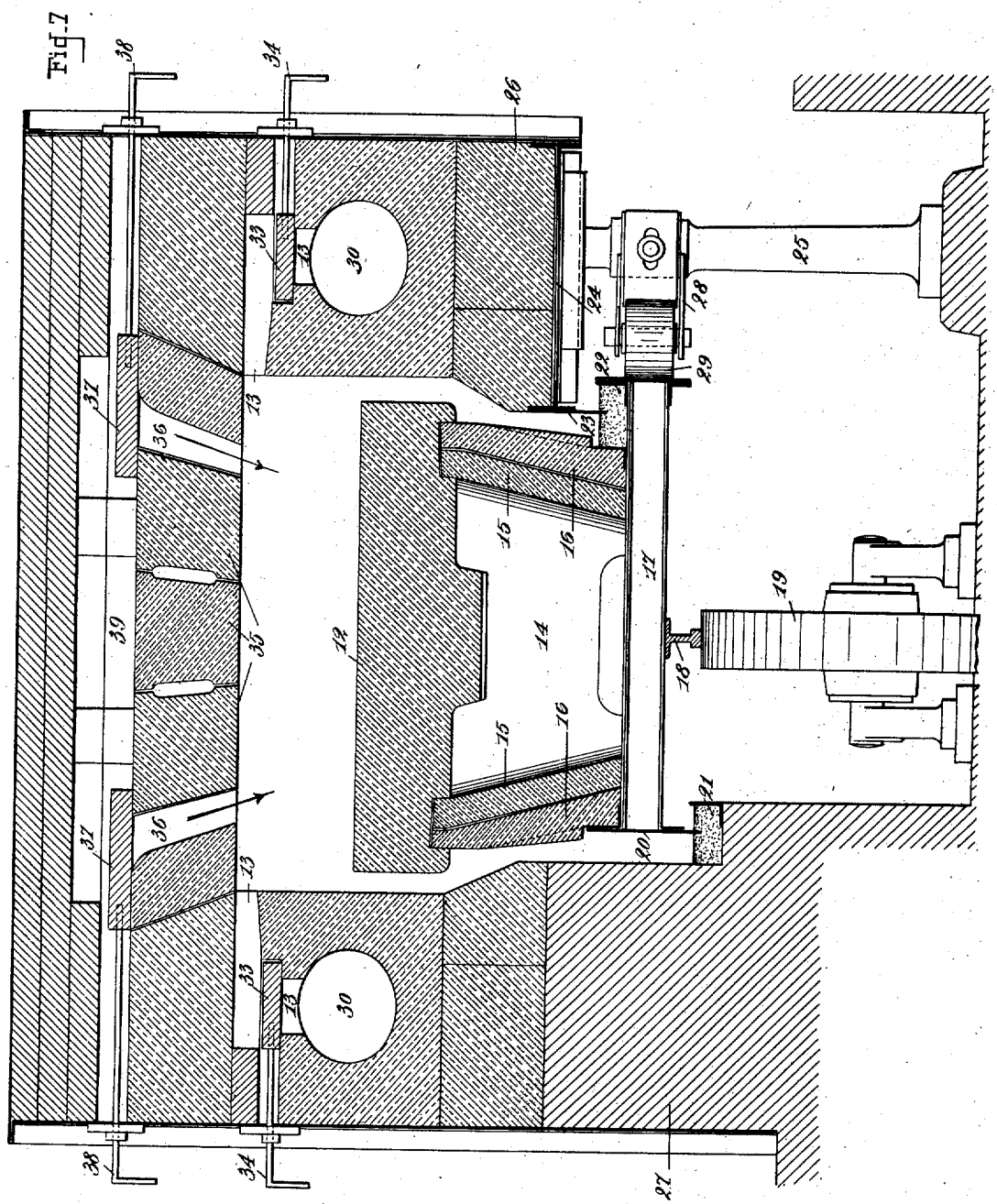

UNITED STATES PATENT OFFICE.

HENRI STURM, OF PARIS, FRANCE.

FURNACE.

SPECIFICATION forming part of Letters Patent No. 695,084, dated March 11, 1902.

Application filed June 25, 1901. Serial No. 66,027. (No model.)

*To all whom it may concern:*

Be it known that I, HENRI STURM, a citizen of the Republic of France, and a resident of Paris, France, have invented certain new and useful Improvements in and Connected with Furnaces, of which the following is a specification, this invention having been patented in France December 11, 1900, No. 306,156, and in England June 8, 1901, No. 11,777.

The furnace which forms the object of the present invention is composed of two twin galleries intimately connected the one with the other and forming as a whole a furnace enabling the products known industrially under the terms "stone glass," "Garchey stone," or "ceramo crystal" to be obtained at once by devitrifying, molding, and rebaking, and generally any products necessitating a molding under heat, these operations being effected by a peculiar circulation of the products of combustion and of the reheated air in the ceilings of the two galleries or in the galleries themselves.

For the manufacture of the products hereinbefore specified the raw material must be brought to and maintained at a given temperature for a certain time in order to effect the devitrifying thereof. When this result is attained, the objects which it is desired to produce must be rapidly molded at this temperature and then returned to the furnace for rebaking. This double operation might in a case of necessity be effected in a furnace having a single gallery by making the latter of sufficient size; but such a furnace system would have the drawback of requiring considerable space and absorbing an enormous quantity of heat, while my apparatus enables a much better result to be obtained with a better utilization of the space occupied and of the hot gases—that is to say, of the fuel—by means of twin galleries. These twin galleries may be juxtaposed or superposed concentrically or one crossing the other. In all the cases these twin galleries form mutually part of one another in this sense that the products of combustion traverse the gallery for reheating after having passed through the gallery of devitrification, which is at the highest temperature, without discontinuity, while, on the other hand, the air for recuperating the heat passes first through the ceiling of the reheating or rebaking gallery in order to afterward pass into the devitrification-gallery.

To allow of the invention being better understood, reference will now be made to the accompanying drawings, in which, as an example—

Figure 2:
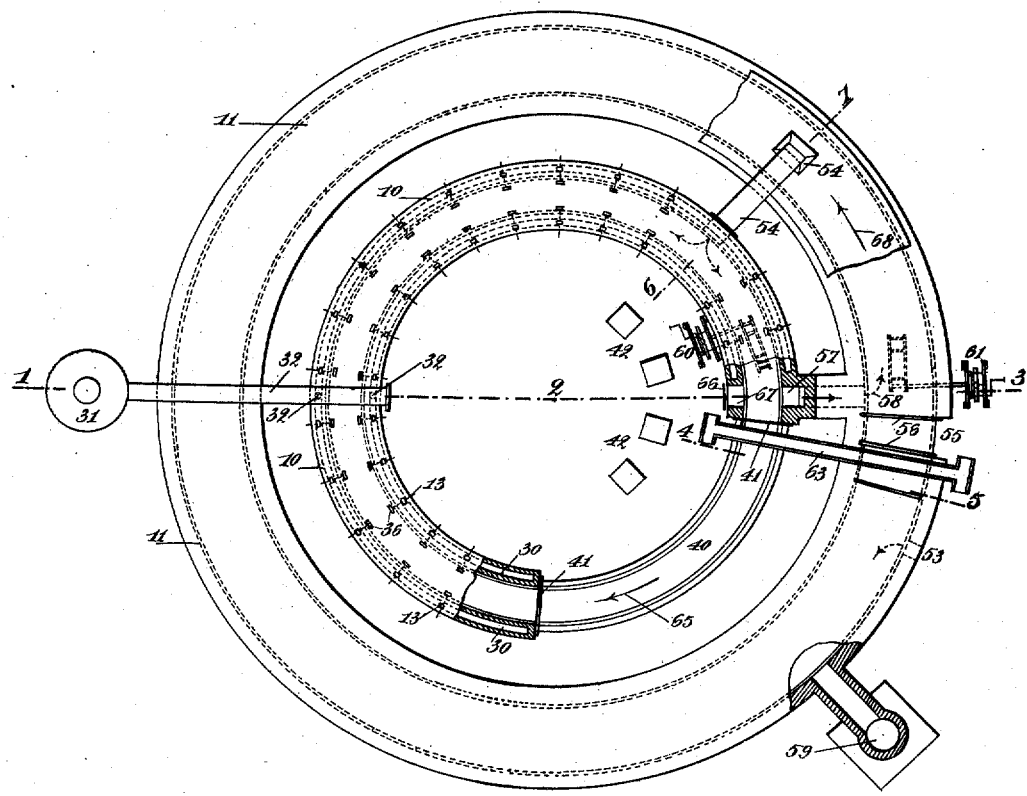
Figure 4:
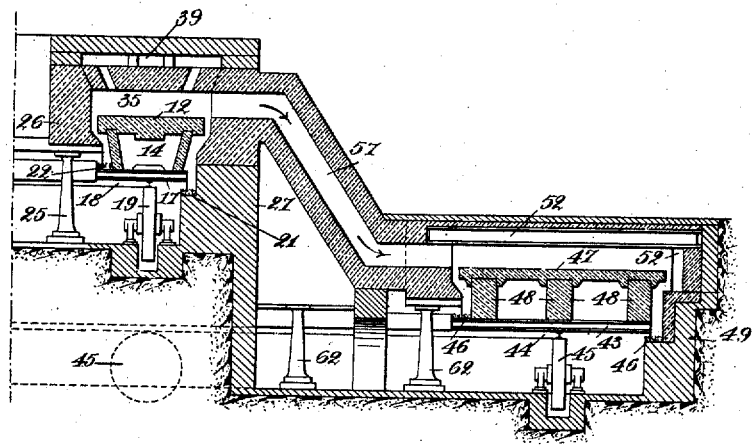
Figure 6:
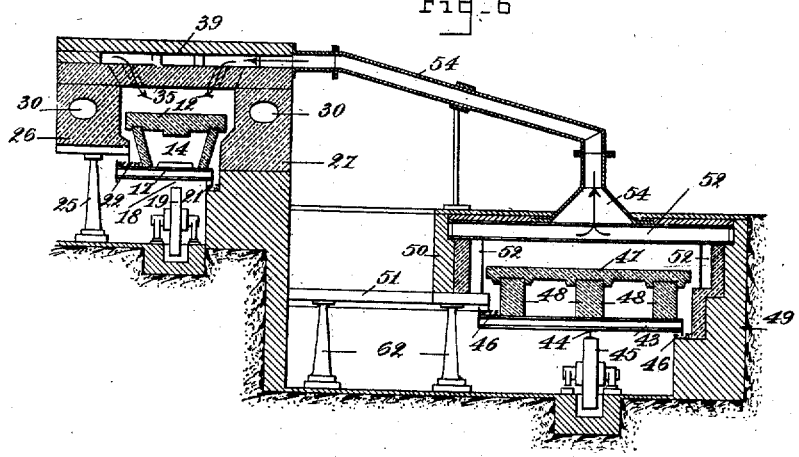

Figure 1 is an elevation and partial section, on the line 1 2 3 of Fig. 2, of a furnace arranged in conformity with this invention; Fig. 2, a plan view with parts removed; Fig. 3, a section, on an enlarged scale, on the line 1 2 of Fig. 2; Fig. 4, a similar sectional view on the line 2 3 of the same Fig. 2; Fig. 5, a similar sectional view on the line 4 5 of Fig. 2; Fig. 6, a similar sectional view on the line 6 7 of Fig. 2; and, finally, Fig. 7, a transverse section, on an enlarged scale, showing the details of construction of the devitrifying-furnace proper.

The same reference-numerals represent the same parts in the various figures.

This furnace is formed by a combination of two concentric galleries 10 and 11, the gallery 10 serving for effecting the devitrification of the substances to be treated, the other, 11, for the rebaking of the said substances when devitrified and molded. These two galleries 10 and 11 are both provided with movable beds or soles; but the details of construction differ in both galleries.

The first gallery 10, constituting the devitrifying-gallery, is arranged as shown in detail in Fig. 7. It comprises a movable sole or bed 12, formed of slabs, the whole of which constitutes a ring, the slabs being made of fire-resisting material supported by other transverse slabs 14, leaving between them interstices which are closed on their other faces by double annular walls 15 and 16, supported, as are also the transverse slabs 14, by an annular metallic plate or foundation 17, running, by means of a reversed rail 18, on a series of rollers 19, arranged in a circle. A vertical external band 20, of sheet metal, bordering the foundation-plate 17, to which it is attached by means of angle-irons, moves in a channel 21, formed in the external masonry 27 of the furnace and forming a sand-bath, while on the other side a sand-bath 22 is formed in a similar manner on the foundation-plate 17, a metallic joint being obtained by a circular plate 23, attached, by means of angle-irons, to a platform 24, which sustains the internal wall 26 of the furnace by means of columns or pillars 25. These columns 25 also, by means of arms 28 of regulatable length, support traveling rollers 29, serving to maintain the foundation-plate 17 exactly in position. The internal and external walls of the furnace, 26 and 27, each have at their upper part at the level of the bed 12 a passage 30, in which circulates the gas produced by a gas-producer 31, this gas being conveyed by a suitable arrangement of pipes 32. Registers 33, operated from the outside of the furnace by means of rods 34, allow communication to be broken or established at will between the passage 30 and the ports or apertures 13, by which these passages communicate with the gallery of the furnace. The ceiling of this gallery is formed by means of arch-stones 35, also made of fire-clay or other fire-resisting material, on the sides of which ceiling apertures 36 are formed, which may be opened or closed by means of registers 37, operated from the outside by means of an arrangement of rods 38, and by which apertures hot air may be introduced in the form of jets, which hot air circulates in a recess 39, formed in the roof of the furnace, and is produced as will be hereinafter specified.

The devitrifying-gallery 10, just described, has over about a quarter of its surface a charging aperture or door 40, limited by two registers 41, which close the parts of the furnace in which the devitrification is effected. The other gallery 11, in which is effected the rebaking of the products obtained in the devitrifying-gallery 10, which are then molded in presses on their discharge from the last-named gallery, is constructed more lightly than the gallery 10, because it has not to withstand nearly so high a temperature. It is also formed by a platform 43, traveling, in the manner hereinbefore described, by means of reversed rails 44 on rollers 45 and adapted to be guided laterally, as hereinbefore specified. Sand-baths 46 are provided, and the sole 47 is supported by three solid pieces of masonry 48. The external wall 49 of the furnace is masonry. As regards the internal wall 50, it is formed by a wall supported by columns 62, which serve also to support a platform 51, forming the service-platform. The ceiling and the walls of the gallery are formed by means of caissons or boxes of sheet metal, in which air drawn from the exterior of the gallery through an aperture 53 may circulate, which air is caused to traverse all the surface of the roof and sides of the gallery and is discharged by a funnel and pipe 54, which convey it, as hereinbefore specified, into the celing 39 of the devitrifying-gallery 10. The outer or rebaking gallery 11 has also a charging and discharging door 55, closed by means of registers 56. The hot gas coming from the devitrifying-gallery 10 after having been utilized in this gallery is brought into the outer gallery 11 by a pipe 57. It is distributed in this gallery 11 in the direction indicated by the arrow 58 in order to pass therethrough to the chimney 59.

The apparatus just described is completed by a system of gearing 60 and 61, serving to produce by means of hooked chains the displacement of the movable soles. A chute 63, Fig. 5, serves for conveying the molded products from the devitrifying-gallery 10 to the outer or rebaking gallery 11.

In order to allow of the sole 12 of the devitrifying-furnace being easily cleaned when it reaches the discharge-door 40, the internal and external walls 26 and 27 of this furnace are terminated at this point by slopes 64, the height and inclination of which are such that their line of slope passes above the projecting edge of the sole 12 of the gallery, which allows of the insertion of a strip of sheet metal, by means of which the ashes or waste scraped off the sole may be easily expelled away from the basement of the furnace.

The working of this improved system of furnace takes place as follows: The movable sole 12 of the devitrifying-gallery 10, which moves in the direction indicated by the arrow 65, being momentarily at rest, the substances to be devitrified are charged in by the charging-door 40. When that has been done, the registers 41 are lifted and the movable bed is caused to advance. While the latter enters at one end the gallery 10 projects at the other end by an equal amount, bringing into the open air the devitrified substances, which may be withdrawn, if preferred, by the discharging-door 66, provided with a register 67, which substances are immediately conveyed to presses 42 and then returned by a chute 63 to the door 55 of the outer furnace, where they will be dealt with presently. The products which have entered the devitrifying-gallery 10 immediately undergo the combined action of the gas produced by the gas-producer entering by its passage 30 and openings 13 and of the hot air which enters through separate apertures 36 and which permits of the combination of these gases, and the said products thus traverse the whole devitrifying-gallery 10 in the direction of the arrow 65 and are then discharged at its other end at the door 66, as hereinbefore stated. The products to be rebaked arrive, as stated, at the door 55 of the rebaking-gallery, the sole or bed of which travels around in the direction of the arrow 68, and in this gallery the products are rebaked by the action of the gas arising from the devitrifying-gallery, which is introduced by a pipe 57 and escapes to the chimney 59, traversing the gallery in the direction indicated by the arrow 68. During this journey the hot gases give up a portion of their heat to the air which is introduced by the aperture 53 and which circulates in the caissons 52 of this gallery, in which in turn it becomes heated and then passes when hot by the funnel and pipe 54 into the recess 39, formed in the ceiling, which by its apertures 36 distributes it and mixes it with the hot gases derived from the gas-producer, as hereinbefore specified, thus utilizing as completely as possible all the lost heat.

Of course the forms, dimensions, proportions, and accessory parts may be varied without departing from the scope of the invention, and any suitable material may be employed for their construction.

I declare that what I claim is—

1. A devitrifying and rebaking furnace comprising two concentric galleries having movable bottoms, and means for conveying gases to one of said galleries and thence to the other gallery.

2. A devitrifying and rebaking furnace comprising inner and outer concentric furnace-galleries, endless moving bottoms for said galleries, means for supplying gases to the inner gallery and passing them therethrough, and means for conveying said gases from the inner gallery to the outer, substantially as described.

3. In combination, the inner and outer annular galleries, endless conveying means for conveying the articles to be treated through said galleries, means for passing gases through one of said galleries in the direction of travel of the conveyer, and means for conveying the gases from said first-mentioned gallery through the second gallery in the direction of travel of its conveyer, substantially as described.

4. In combination, the inner circular devitrifying-gallery, the outer rebaking-gallery concentric therewith, endless moving bottoms or rolls for said galleries, for supporting the material to be treated, means for supplying heated gases to said inner gallery and passing it therethrough, air-conduits in the walls and roof of said inner chamber whereby air is heated by said heated gases, and means for conveying the heated products from the devitrifying-chamber to the reheating-chamber.

In witness whereof I have hereunto set my hand in presence of two witnesses.

HENRI STURM.

Witnesses:
EDWARD P. MACLEAN,
JULES FAYOLLET.